United States Patent [19]
Roeder

[11] 3,759,502
[45] Sept. 18, 1973

[54] METHOD AND APPARATUS FOR PREVENTING RELATIVE MOTIONS

[75] Inventor: George Roeder, Frankfurt/Main, Germany

[73] Assignee: Messer Griesheim GmbH, Frankfurt am Main, Germany

[22] Filed: June 19, 1972

[21] Appl. No.: 264,042

[30] Foreign Application Priority Data
June 18, 1971 Germany.................. P 21 30 144.0

[52] U.S. Cl............................................ 266/23 E
[51] Int. Cl............................................. B23k 7/10
[58] Field of Search.................. 346/139 A; 74/37; 266/23 R, 23 E, 23 L, 23 K; 192/143

[56] References Cited
UNITED STATES PATENTS
3,351,333  11/1967  Owen et al...................... 266/23 E

*Primary Examiner*—Gerald A. Dost
*Attorney*—Ernest F. Marmorek

[57] ABSTRACT

A method for preventing the relative movement beyond a predetermined magnitude between a driving band set in motion by a driving motor and between a device, such as a torch, clamped on the band and adapted to carry operating instruments thereon, wherein the relative movement arising between the band and the operating device clamped thereon, is secured and signals are fed for stopping the driving motor of the band upon said relative movement exceeding a predetermined magnitude. The invention also discloses a torch cutting apparatus comprising a driving motor, a metal band coupled to the driving motor and adapted to move in a predetermined path, an upper carriage carrying a torch cutting device, an arrangement for clamping the upper carriage onto the band at a predetermined point according to the pattern to be cut, means for sensing a relative movement between the band and the upper carriage and developing a signal when the relative movement exceeds a predetermined magnitude, and an arrangement responsive to the signal and causing a turning off of the driving motor.

9 Claims, 5 Drawing Figures

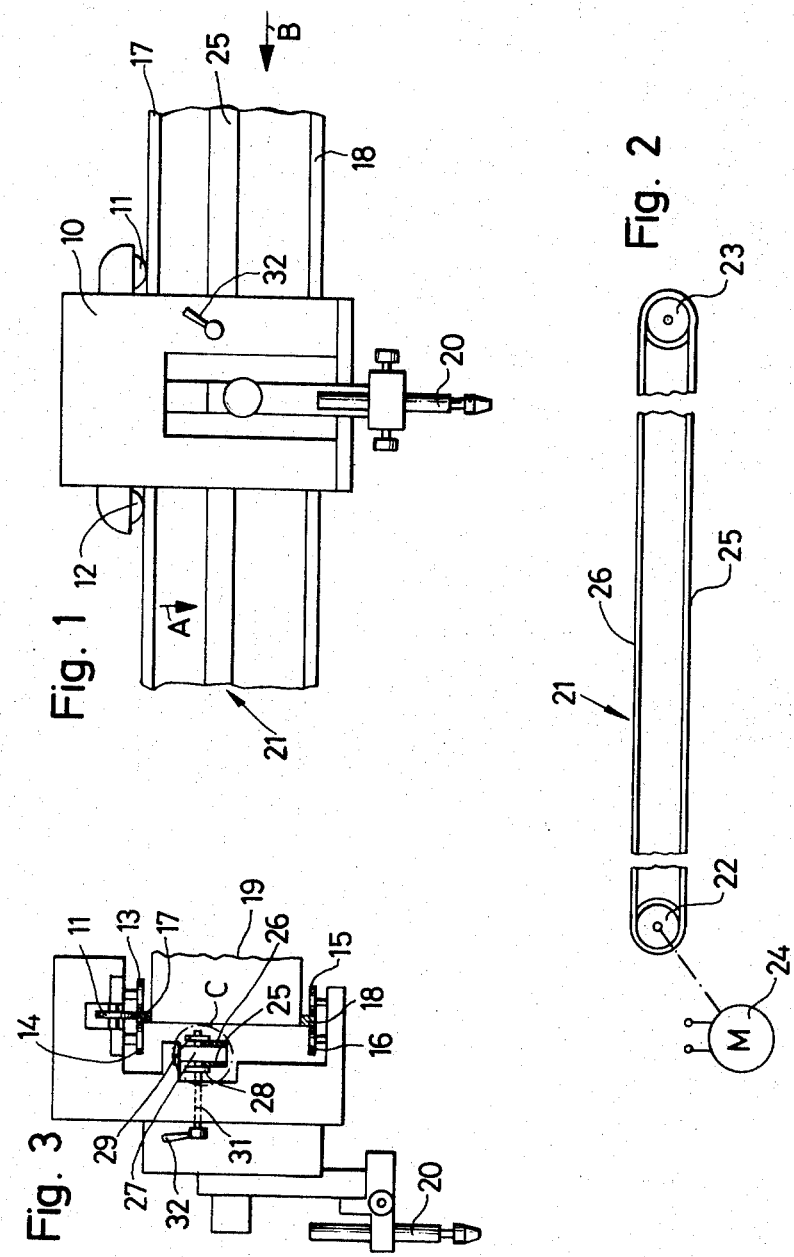

3,759,502

METHOD AND APPARATUS FOR PREVENTING RELATIVE MOTIONS

FIELD OF THE INVENTION

The present invention relates to a method and apparatus for preventing a relative movement beyond a permissible magnitude between a driving means, such as a driving or actuating metal strip and an instrument carrying means, such as the upper carriage of a torch cutting machine.

BACKGROUND OF THE INVENTION

In torch cutting machines in which a plurality of upper carriages on which the torch cutter itself is secured, and are moved according to a program, such as a copying process, for example, controlled by photoelectric means, or some other manner, along a curve corresponding to the cutting pattern. It is necessary that the upper carriage is moved back and forth over an exact path as controlled by the rotational movement of a drive. Such drive of the upper carriage is performed by an endless transporting means which can be in the form of a metal or a preferably vertically mounted steel strip or conveyor band. In contrast to other endless transporting or conveying means, such as chain or cable, the preferred metal band remains rigid and stiff in the direction of its surface expansion and it will not sag downward. The metal band is usually guided over a pair of guide rollers of which one is the driving roller.

On such metal band either on its front or back section the upper carriages are clamped according to the contours of the pattern which are to be cut out by the torch device. By moving the metal band the upper carriages will undergo similar movement, that is, mounted on the oppositely lying band section moved in opposite direction with respect to each other.

Inasmuch as the upper carriages carrying the cutting torch must be secured on various places on the steel band in order that the upper carriages with their cutting torches could reach any desired contour, obviously, there must be a coupling between the upper carriage and the metal band, which is usually a clamping arrangement. Inasmuch as the clamping arrangement represents a positive force coupling but not a spatial physical connection between the metal strip and the upper carriage, therefore, there will be a relative movement between such portions when, for instance, large bearing frictions or path frictions arise during the long rail path on which the upper carriage travels. Such relative movement between the metal strip and the upper carriage will lead to a situation that the upper carriage with the torch cutting device mounted thereon undergoes a movement which does not any more correspond to the movement prescribed by the control pattern so that the workpiece which is being cut out will become too small and therefore a waste is produced. Or, for example, in case a cut out piece must be produced from a plate, then due to the relative movements described above the cut

SUMMARY OF THE INVENTION

It is, therefore, an object of the present invention to provide a method and apparatus for reliably sensing the relative movement between the driving band and the upper carriage of a torch cutting apparatus and turning off of the driving means of said driving band in the event the relative movement sensed exceeds a predetermined magnitude.

According to the present invention a relative movement occurring between the band and the upper carriage is sensed by a device which when the relative movement exceeds a predetermined magnitude will cause a turning off of the driving means of the band so that an immediate stopping of the band will give the opportunity to correct the defective condition and avoid producing a waste by resetting the apparatus in the desired position and thereby producing workpieces according to a predetermined pattern and control program.

According to the present invention in a torch cutting apparatus a metal driving band is provided on which an upper carriage is clamped which carries the torch cutter. The upper carriage according to the present invention is provided with a sensing device sensing the relative movement between the metal band and the clamped upper carriage and which is coupled to a switching device causing a turning off of the driving means of the band in the event there is an excessive relative movement between the band and the upper carriage.

In a preferred embodiment of the present invention the sensing device is a sensor having a sharp point which is in abutting relationship with the metal band. The sensor itself is coupled to a pin which is rotatably journalled within the upper carriage and which is provided with a switching rod operating a switching device. This is an extremely simple and reliable construction of the sensor means.

In order that the sensor means could abut against the metal band exactly according to the present invention, the sensor is carried by a leaf spring which couples the sensing tips to a pin and which in turn, as mentioned above, is journalled within the upper carriage.

According to the present invention the switching rod mounted for rotation with the aforementioned pin at one end which is opposite to the end operating the switching device is coupled by means of a spring to the upper carriage. Such spring causes the centering of the switching rod in a null position automatically as soon as the clamping of the upper carriage with the band ceases or in the absence of a relative movement between the band and the upper carriage.

The switching arrangement may comprise according to the present invention camming means and/or electrical switching devices, such as micro-switches or other types of switching elements which are operable by movement of the switching rod over a path on which such switching elements are placed, if they are micro-switches.

According to the present invention the sensing device may comprise at least one photocell coupled with an electronic switching arrangement to operate same when the magnitude of the relative movement between the band and the upper carriage exceeds a predetermined magnitude.

DESCRIPTION OF THE DRAWINGS

The invention will become more readily apparent from the following description of a preferred embodiment thereof shown, by way of example, in the accompanying drawings, in which:

FIG. 1 is a front view of an upper carriage of a torch cutting machine, partly in section;

FIG. 2 is a top view in the direction of the arrow A on the metal band of FIG. 1;

FIG. 3 is a side view of the upper carriage viewed in the direction of the arrow B in FIG. 1;

DESCRIPTION OF THE PREFERRED EMBODIMENT

Figure 4:
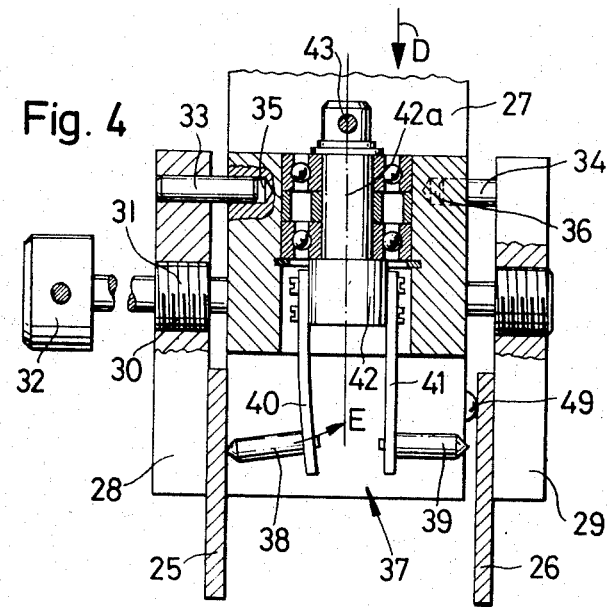
FIG. 4 is an enlarged illustration of the cut-out portion C of FIG. 3.

With reference to FIG. 1 it is seen that the upper carriage 10 of a torch cutting machine which is not shown itself to avoid a crowding of the portions to which the invention pertains, is arranged for movement along a path represented by the rails 17,18 by means of its rollers 11–16. The paths or rails 17,18 are mounted on a rail mount 19 of the torch cutting device which itself is not shown and, more particularly, the rail 17 is provided on the upper side of the carrier while the rail 18 is provided on the lower side of the carrier 19.

The upper carriage 10 which carries a torch cutting device 20 is driven in the illustrated embodiment by a steel conveyor band 21 which is mounted in its operational position in a vertical direction, that is, in its front view as shown in FIG.1 the belt itself faces its viewer with its wide side. With reference to FIG.2, which illustrates the steel conveyor band 21 in its entirety, it is seen that the band 21 is guided over a pair of guide rollers 22,23 of which, for example, the roller 22 is the driving roller and is driven by a motor 24. According to the desired control pattern, the motor 24 is rotated one way or the other and, consequently, either the front 25 or back 26 band section moves to the right or to the left.

On the steel conveyor band 21 either on its front 25 or back 26 portion an upper carriage 10 or a plurality thereof is mounted at a position which is predetermined by the desired contour of the pattern to be cut out.

Figure 5:
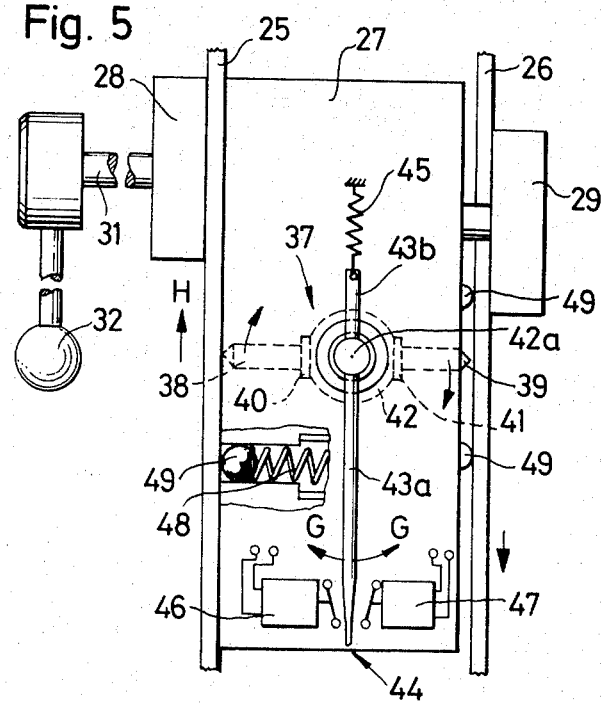
FIG. 5 is a top view in the direction of the arrow D according to FIG. 4.

The securing of the upper carriage to the band 21 is performed by a clamping arrangement as more particularly can be seen in FIGS. 3–5.

The upper carriage 10 itself contains the clamping arrangement in the form of a clamping jaw carrier 27 as well as a front clamping jaw 28 and a back clamping jaw 29 which are coupled with each other by means of an operating shaft 31 having a thread 30 thereon. The shaft 31 is rotated by means of a lever 32 which, when moved or rotated in clockwise direction, causes the front movable clamping jaw 28 to move in the direction of the clamping jaw carrier 27 and in the direction of the front section 25 of the steel band 21, so that there will be a force coupling between the front section of the band 21 and the upper carriage 10, as seen in FIG.4. By rotating the arm 32 in counter clockwise direction, in another set-up, the back clamping jaw 29 becomes clamped onto the back band section 26. In order to prevent a rotation or shifting of the clamping jaws 28 or 29 during the clamping process, the jaws 28 and 29 are provided by guide pins 33 and 34 which are in operative relationship with corresponding guide recesses 35 and 36 in the clamping jaw carrier 27 when the respective clamping jaw is operational.

The clamping jaw carrier 27 is provided also with a sensing arrangement 37 which comprises a pair of sensors 38 and 39 each being provided with a sharp end point. Such sensors 38 and 39 are carried by leaf springs 40 and 41, respectively, which are secured by screws to a bolt 42 which is journalled on ball bearings in the clamping jaw carrier 27. On bolt 42 a switching rod 43 is secured, one lever arm 43a of which extends into the operating region of a switching arrangement 44 while the other lever arm 43b of which is coupled with a spring means 45 secured to the clamping jaw carrier 27.

The switching arrangement 44 itself in the illustrated embodiment comprises a pair of micro switches 46,47 which are secured onto the clamping jaw carrier 27.

By means of the above-described sensing arrangement 37 and switching arrangement 44 the relative movement between the steel band 21 and between the clamped upper carriage 10 thereto is prevented if occurs beyond a permissible value.

The operation of the arrangement according to the present invention is as follows:

During the clamping of the front clamping jaw 28 onto the front section 25 of the band 21 a ball spacer switch 49 which is biased by a spring 48 becomes pressed back in the direction of the clamping jaw carrier 27. The ball spacer switch 49 is provided in order to prevent an undesired operating of the sensors 38 and 39 by the front 25 or back 26 section of the band 21 when the clamping jaw carrier 27 has not been clamped on them yet.

Simultaneously with the pressing back of the ball spacer switch 49, the sensor 38 with its pointed tip will abut against the force of the leaf spring 40 in the direction of the arrow E (FIG.4) and due to the force of the leaf spring the tip of the sensor 38 becomes pressed against the front section 25 of the band 21.

Then when the band 21 is moved by the motor 24 as controlled by the control devices, not shown, of the torch cutting apparatus, it will cause a simultaneous movement of the upper carriage 10.

In the event there is a large relative movement between the band 21 and the clamping jaw 28 or clamping jaw carrier 27 due to the large traveling path or bearing frictions, then the sensor 38 pressed against the band 21 will become carried by the band 21 to a certain extent along the direction of the band movement H (FIG.5) and, as a result, the bolt 42 will be rotated about its axis 42a as seen by the curved arrows in FIG.5 and, the switching rod 43 becomes deflected from its null position whereupon the spring 45 which serves to stabilize the switching rod 43 in its null position along with the sensors 38,39 becomes tensioned additionally.

The pivoting movement of the lever arm 43a of the switching rod 43 causes an actuation of the switch 46, which is an ordinary micro switch, and which in turn will cause an interruption of the movement of the band 21 by turning off the motor 24. Simultaneously a warning signal can be operated by the switch 46.

After removing the source of error or defect and after shortly opening up of the clamping jaw 28, the torch cutting apparatus can be set back again into operation. The sensor 38 and the switching rod 43 return again into their null positions under the returning effect of the spring 45 which comes into play upon the releasing of the clamping for a short time.

In the event the upper carriage band is mounted not on the front section 25 of the band 21 as above described, but it is mounted on the back section 26 of the band 21, then during a relative movement the sensor 39 is also moved along a path H similarly as described with respect to sensor 38 and causes an appropriate rotation of the switching rod 43, then the switch 46 becomes actuated and the band 21 becomes stopped by the turning off of the motor 24.

Since the relative movements occurring within the apparatus will directly affect the driving means 24 of the band 21 as soon as they arise, the lever arm 43a of the switching rod 43 is constructed and dimensioned to have such a length that upon exceeding the permissible magnitude by the relative movement within the apparatus, it will then and only then, cause an actuation of the switches 46 or 47 by moving through the appropriately designed switching path G as illustrated in FIG.5.

It is within the scope of the present invention that the relative movement of the sensors 38 or 39 and of the switching rod 43 can be made to cause a variation in a capacitance, inductance or ohmic magnitude, whereupon such magnitudes by virtue of their arrangement in a control circuit, could cause the delivery of control signals to other circuit parts and to the motor 24. A change of this magnitude could cause, for instance, a change in the state of a switching circuit or switching element, which in turn could be connected to control the motor 24 driving the band 21 and/or operate also a warning device.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A method for preventing the relative movement beyond a predetermined magnitude between a driving band set in motion by a driving means and between a device clamped on the band and adapted to carry operating instruments thereon comprising the sensing of the relative movement arising between the band and the operating device clamped thereon, feeding signals for stopping the driving means of the band upon said relative movement exceeding a predetermined magnitude.

2. A torch cutting apparatus comprising a driving means, a metal band coupled to said driving means and adapted to move in a predetermined path, an upper carriage carrying torch cutting means, means for clamping said upper carriage on said band at a predetermined point according to the pattern to be cut, means for sensing a relative movement between said band and said upper carriage and developing a signal when said relative movement exceeds a predetermined magnitude, and means responsive to said signal and causing a turning off of the driving means.

3. The torch cutting apparatus as claimed in claim 2, wherein said sensing means comprises at least one sensor device having a pointed sensing tip adapted to abut against said band, a switching rod mounted for rotation about a pin means, means for coupling said pin means with said switching rod whereby a movement of said sensor tip means with said band causes a rotation of said pin means and a displacement of said switching rod over a switching path.

4. The torch cutting apparatus as claimed in claim 3, wherein said sensing means comprises leaf spring means, said sensor tip means being mounted on said leaf spring means coupling said sensor tip means with said pin means.

5. A torch cutting apparatus as claimed in claim 3, wherein said switching means comprises an electrical switch means mounted for sensing a displacement of said switching rod means over said switching path.

6. The torch cutting apparatus as claimed in claim 5, wherein said electrical switch means is a microswitch means placed along said switching path and being operable by said switching rod means when said switching rod means is displaced over said switching path, said switching path being dimensioned to correspond to the permissible magnitude of relative movement.

7. The torch cutting apparatus as claimed in claim 5, wherein said electrical switch means is an electronic element undergoing a change in its electrical magnitude in response to the displacement of said switching rod over said switching path and developing a signal in response to such change of its electrical magnitude to control the operation of said driving means.

8. The torch cutting apparatus as claimed in claim 3, wherein a spring means is provided for coupling an end portion of said switching rod to said upper carriage means for fixing said switching rod in a null position in absence of a relative movement between said upper carriage and said band.

9. The torch cutting apparatus as claimed in claim 2, wherein said sensing means comprises photo sensing means for sensing the relative movement between said upper carriage means and said band and developing a signal which upon exceeding a predetermined magnitude will turn off said driving means.

* * * * *